United States Patent
Chen

(10) Patent No.: US 8,913,203 B2
(45) Date of Patent: Dec. 16, 2014

(54) STEREOSCOPIC DISPLAY DEVICE COMPRISING A PHASE RETARDATION FILM WITH FIRST-PHASE AND SECOND-PHASE RETARDATION REGIONS CORRESPONDING TO POSITIONS OF LEFT AND RIGHT EYE PIXEL REGIONS

(75) Inventor: Yu-Sheng Chen, Miao-Li County (TW)

(73) Assignees: Innolux Corporation, Miao-Li County (TW); Innocom Technology (Shenzhen) Co., Ltd., Longhua Town, Shenzhen (CN)

( * ) Notice: Subject to any disclaimer, the term of this patent is extended or adjusted under 35 U.S.C. 154(b) by 273 days.

(21) Appl. No.: 13/588,671

(22) Filed: Aug. 17, 2012

(65) Prior Publication Data

US 2013/0044268 A1   Feb. 21, 2013

(30) Foreign Application Priority Data

Aug. 18, 2011   (TW) .............................. 100129628 A

(51) Int. Cl.
| | | |
|---|---|---|
| *G02F 1/1335* | (2006.01) | |
| *G02B 27/22* | (2006.01) | |
| *G02B 27/00* | (2006.01) | |
| *G02B 27/26* | (2006.01) | |

(52) U.S. Cl.
CPC ............ *G02B 27/26* (2013.01); *G02B 27/0018* (2013.01); *G02F 1/1335* (2013.01)
USPC .............................. 349/15; 349/117; 359/462

(58) Field of Classification Search
USPC ............ 349/15, 117–119; 359/462–469, 472, 359/475, 477
See application file for complete search history.

(56) References Cited

U.S. PATENT DOCUMENTS

2009/0009451 A1   1/2009   Hamagishi
2012/0169979 A1*  7/2012   Cheng et al. ................... 349/123

FOREIGN PATENT DOCUMENTS

| CN | 101339325 A | 1/2009 |
| CN | 101363981 A | 2/2009 |
| TW | 201109788 A1 | 3/2011 |

OTHER PUBLICATIONS

TW Office Action dated Mar. 25, 2014.
Kang, H., et al.; "A Novel Polarizer Glasses-type 3D Displays with a Patterned Retarder (LGD);" SID Symposium Digest of Technical Papers; vol. 41; Issue 1; May 2010; pp. 1-4.
CN Office Action dated Aug. 27, 2014.
English Abstract of CN101363981 (Published Feb. 11, 2009).

* cited by examiner

*Primary Examiner* — Paul Lee
(74) *Attorney, Agent, or Firm* — McClure, Qualey & Rodack, LLP

(57) ABSTRACT

A display module includes a transparent substrate, a black matrix layer, several light-shielding elements and a phase retardation film. The transparent substrate includes left-eye pixel regions and right-eye pixel regions for respectively displaying left-eye images and right-eye images. Each left-eye pixel region is adjacent to each right-eye pixel region. The black matrix layer is disposed on one side of the transparent substrate and corresponds to each boundary between the left-eye and right-eye pixel regions. The light-shielding elements are disposed on the other side of the transparent substrate and respectively correspond to the boundaries between the left-eye and right-eye pixel regions. The phase retardation film is disposed on the other side of the transparent substrate, and has first-phase retardation regions and second-phase retardation regions with difference phases. Positions of the first-phase and second-phase retardation regions respectively correspond to those of the left-eye and right-eye pixel regions.

16 Claims, 3 Drawing Sheets

STEREOSCOPIC DISPLAY DEVICE COMPRISING A PHASE RETARDATION FILM WITH FIRST-PHASE AND SECOND-PHASE RETARDATION REGIONS CORRESPONDING TO POSITIONS OF LEFT AND RIGHT EYE PIXEL REGIONS

This application claims the benefit of Taiwan application Serial No. 100129628, filed Aug. 18, 2011, the subject matter of which is incorporated herein by reference.

BACKGROUND OF THE INVENTION

1. Field of the Invention

The disclosure relates in general to a display module and a display device using the same, and more particularly to a three-dimensional (3D) display module and a display device using the same.

2. Description of the Related Art

In the earlier days as flat-screen displays are introduced subsequent to cathode ray tube (CRT) displays, since image signals need no adjustment to adapt to flat-screen displays and as flat-screen displays have also become cheaper, CRT displays are gradually out-phased and flat-screen displays quickly became prevalent. In the recent years, accompanied with technology advancement, display manufacturers have long striven to provide yet better displays for presenting most natural and most realistic three-dimensional (3D) images to consumers. Therefore, 3D display techniques are a center of attention in the display field.

3D display techniques are in large divided into glasses type and naked-eye type. Techniques of the glasses type include shutter glasses that in turn display left-eye and right-eye images at an update frequency of 120 Hz. Shielding time points of the shutter glasses are determined via a synchronization signal of a display. When the display displays the left-eye image, the shutter glasses opens the left-eye lens and shields the right-eye lens; when the display displays the right-eye image, the shutter glasses opens the right-eye lens and shields the left-eye lens. However, with this technique, time given for viewing a monitor by the left eye and the right eye is extremely short. As a result, overall brightness offered by the display device is significantly reduced while also giving a viewer a sense of image flicker.

Another 3D display adopting the glasses type presents 3D images via polarization glasses. A principle of this technique is that a phase retardation film is disposed in the front of a liquid crystal display (LCD) to separate left-eye and right-eye images via polarization directions of light. However, as a viewing angle increases, a crosstalk issue such as a left-eye image entering a right-eye may be caused to lead to visual confusion and discomfort. Therefore, there is a need for a 3D display device that provides a large viewing angle and reduced crosstalk and/or enhancing overall brightness.

SUMMARY OF THE INVENTION

The disclosure is directed to a display module and a display device using the same. Problem of viewing angle crosstalk of the display module and the display device using the same could be solved by using shielding elements of the present disclosure.

According to an aspect the present disclosure, a display module is provided. The display module includes a first transparent substrate, a black matrix layer, a plurality of first light-shielding elements and a phase retardation film. The first transparent substrate includes a plurality of left-eye pixel regions and a plurality of right-eye pixel regions for respectively displaying left-eye images and right-eye images. Each of the left-eye pixel regions is adjacent to each of the right-eye pixel regions. The black matrix layer is disposed on one side of the first transparent substrate and corresponds to a boundary between the adjacent left-eye pixel region and right-eye pixel region. The first light-shielding elements are disposed on the other side of the first transparent substrate. Positions of the first light-shielding elements substantially correspond to the boundaries between the left-eye and right-eye pixel regions, respectively. The phase retardation film is disposed on the other side of the first transparent substrate, and has first-phase retardation regions and second-phase retardation regions with difference phases. Each of the first-phase regions is adjacent to each of the second-phase retardation regions. Positions of the first-phase retardation regions and the second-phase retardation regions substantially correspond to positions of the left-eye pixel regions and the right-eye pixel regions, respectively. The display module further includes a polarization film disposed between the phase retardation film and the first light-shielding elements.

According to another aspect of the present disclosure, a display device is provided. The display device includes a thin-film transistor module, a display module and a liquid crystal layer. The liquid crystal layer is disposed between the thin-film transistor module and the display module. The display module includes a first transparent substrate, a black matrix layer, a plurality of first light-shielding elements, a phase retardation film and a polarization film. The first transparent substrate includes a plurality of left-eye pixel regions and a plurality of right-eye pixel regions for respectively displaying left-eye images and right-eye images. Each of the left-eye pixel regions is adjacent to each of the right-eye pixel regions. The black matrix layer is disposed on one side of the first transparent substrate and corresponds to a boundary between the adjacent left-eye pixel region and right-eye pixel region. The first light-shielding elements are disposed on the other side of the first transparent substrate. Positions of the first light-shielding elements substantially correspond to the boundaries between the left-eye and right-eye pixel regions, respectively. The phase retardation film is disposed on the other side of the first transparent substrate, and has first-phase retardation regions and second-phase retardation regions with difference phases. Each of the first-phase regions is adjacent to each of the second-phase retardation regions. Positions of the first-phase retardation regions and the second-phase retardation regions substantially correspond to positions of the left-eye pixel regions and the right-eye pixel regions, respectively. The polarization film disposed between the phase retardation film and the first light-shielding elements.

The above and other aspects of the disclosure will become better understood with regard to the following detailed description of the preferred but non-limiting embodiments. The following description is made with reference to the accompanying drawings.

DETAILED DESCRIPTION OF THE INVENTION

Figure 1A:
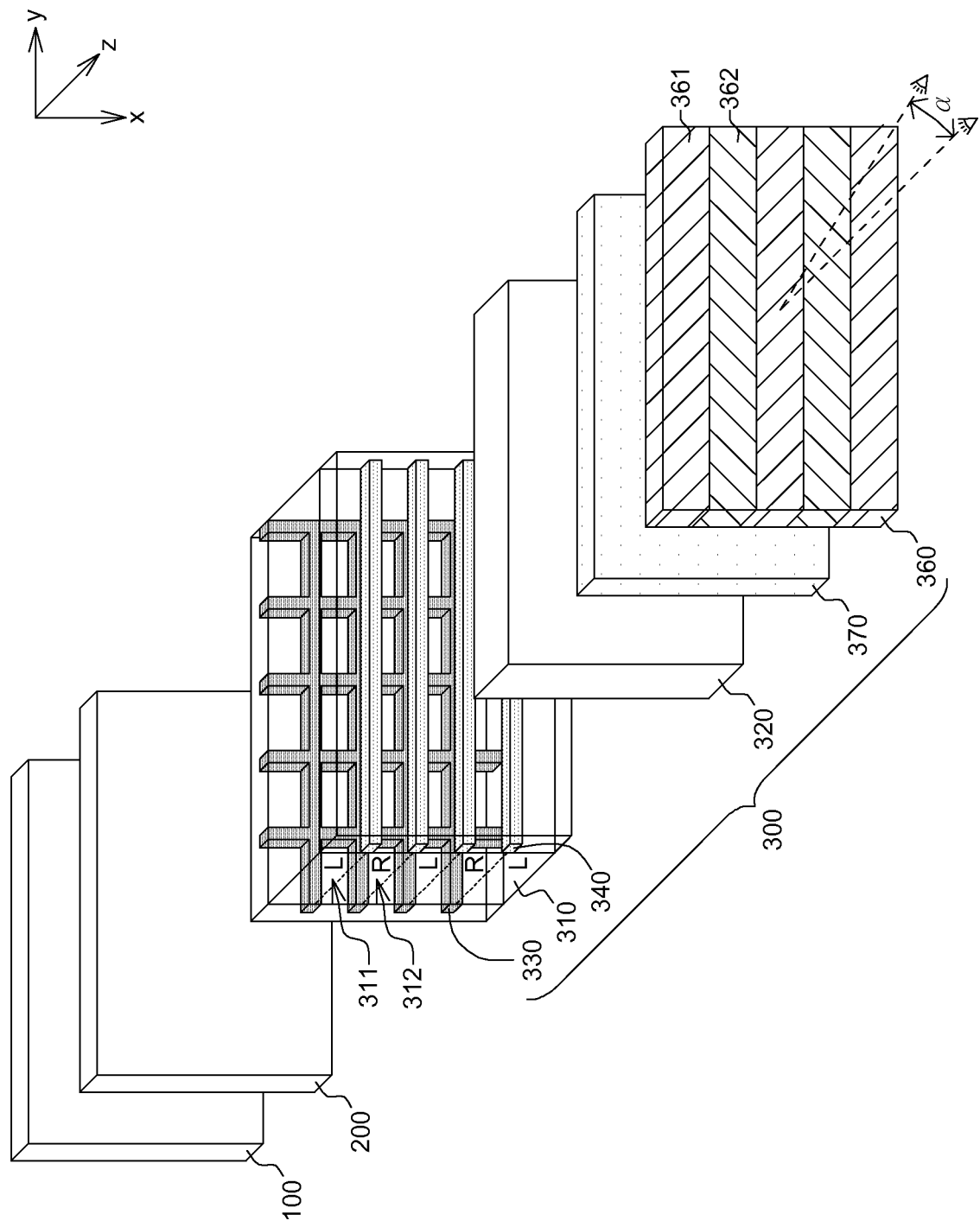
FIG. 1A a schematic diagram of a display device according to an embodiment of the present disclosure.

FIG. 1A shows a schematic diagram of a display device according to an embodiment of the present disclosure. A display device 2, e.g., a 3D display, allows a viewer to view 3D images generated by the display device 2 with the aid of an auxiliary optical tool (e.g., glasses including a phase retardation film). The display device 2 includes a thin-film transistor module 100, a liquid crystal layer 200, and a display module 300. The liquid crystal layer 200 is disposed between the thin-film transistor module 100 and the display module 300. As an electric field change occurs between the thin-film transistor module 100 and the display module 300, liquid crystal molecules in the liquid crystal layer 200 are polarized to accordingly change the polarity of light beams passing through the liquid crystal layer 200.

Figure 1B:
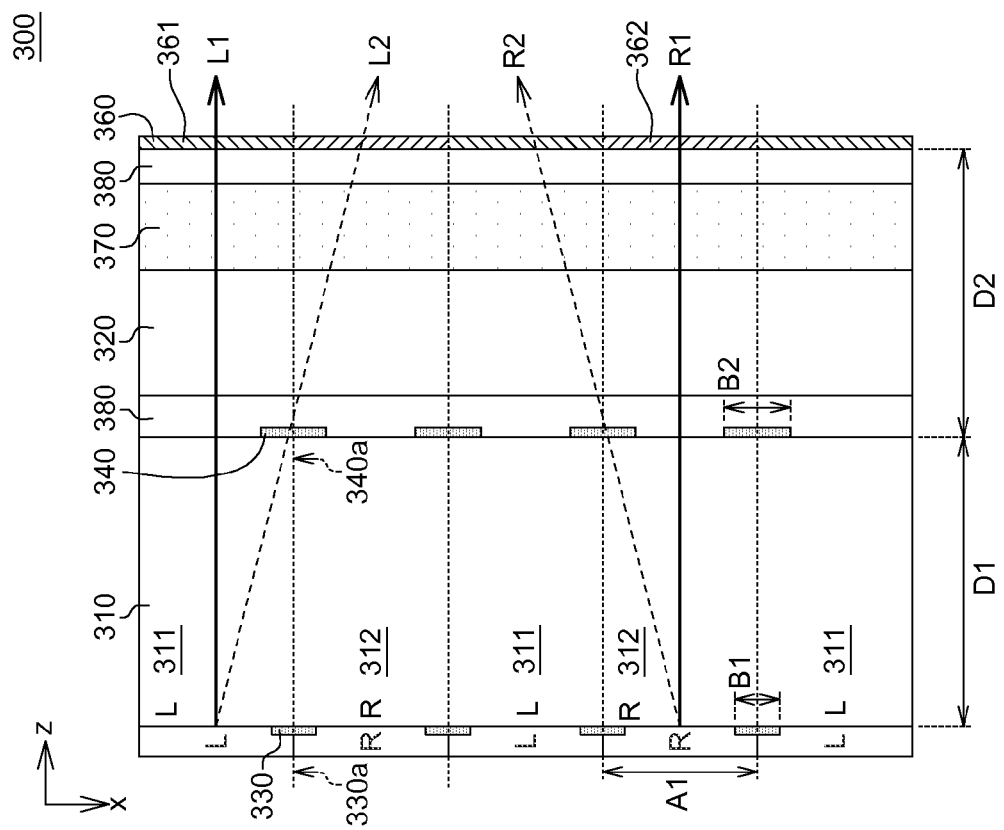
FIG. 1B is a side view of the display module in FIG. 1A.

FIG. 1B shows a side view of the display module in FIG. 1A. With reference to FIG. 1A and FIG. 1B, the display module 300 includes a first transparent substrate 310, a second transparent substrate 320, a black matrix layer 330, a number of first light-shielding elements 340, a phase retardation film 360, and a polarization film 370.

In this embodiment, for example, the first transparent substrate 310 is a glass substrate. The first transparent substrate 310 includes a plurality of left-eye pixel regions 311 for displaying left-eye images, and a plurality of right-eye pixel regions 312 for displaying right-eye images. On an x-y plane, for example, shapes of the regions 311 and 312 are substantially strips extending along the y-axis. Each of the left-eye pixel regions 311 is adjacent to each of the right-eye pixel regions 312. For example, light beams for the left eye enter the first transparent substrate 310 from the left-eye pixel regions 311 at a side towards the −z-axis; light beams for the right eye enter the first transparent substrate 310 from the right-eye pixel regions 312 at a side towards the −z-axis. The black matrix layer 330 is disposed on one side of the first transparent substrate, e.g., on one side of the first transparent substrate 310 towards the −z-axis. The black matrix layer 310 may be disposed at a boundary between the adjacent left-eye pixel region 311 and right-eye pixel region 312. A center axis 330a of the black matrix layer 300 may distinguish the left-eye pixel regions 311 and the right-eye pixel regions 312.

In this embodiment, the phase retardation film 360 is disposed on the other side of the first transparent substrate 310, e.g., the other side of the first transparent substrate 310 towards the +z-axis. The phase retardation film 360 includes a plurality of first-phase retardation regions 361 and a plurality of second-phase retardation regions 362. The first-phase retardation regions 361 and the second-phase retardation regions 362 have different phases, with a phase difference substantially equal to $\lambda/2$, for example. Each of the first-phase retardation regions 361 is adjacent to each of the second-phase retardation regions 362. On the x-y plane, for example, shapes of the first-phase retardation regions 361 and the second-phase retardation regions 362 are substantially strips extending along the y-axis. Positions of the first-phase retardation regions 361 and the second-phase retardation regions 362 substantially correspond to positions of the left-eye pixel regions 311 and the right-eye pixel regions 312, respectively.

An auxiliary optical tool, e.g., a pair of glasses, is required for viewing the display device 2. A left lens of the pair of glasses allows only light beams passed through the first-phase retardation regions 361 to pass through. Similarly, a right lens of the pair of glasses only allows only light beams passed through the second-phase retardation regions 362 to pass through. Under ideal conditions, light beams, e.g., L1, from the display device 2 for the left eye need to enter from the left-eye pixel region 311 at a side towards the −z-axis, and enter the left lens after passing through the first-phase retardation region 361. Similarly, under ideal conditions, light beams, e.g., R1, from the display device 2 for the right eye need to enter from the right-eye pixel region 312 at a side towards the −z-axis, and enter the right lens after passing through the second-phase retardation region 362. Accordingly, both lenses of the glasses may correctly receive light beams corresponding to light beams from the display device 2.

However, due to the omni-directional nature of light beams, it is possible that light beams, e.g., a "cross-region" light beam L2, entering from the left-eye pixel region 312 at a side towards the −z-axis pass through the second-phase retardation region 362. As a result, the light beam L2, originally intended for the left lens, unexpectedly passes through the second-phase retardation region 362 and enters the right lens of the glasses to cause visual confusion and discomfort. The light beam R2 encounters the same issue. In general, the above visual confusion and discomfort aggravate as an angle of elevation or depression from the viewer increases.

In this embodiment, the first light-shielding elements 340 are disposed on the other side of the first transparent substrate 310, e.g., the side of the first transparent substrate 310 towards the +z-axis. For example, on the x-y plane, shapes of the first light-shielding elements 340 are substantially strips extended along the y-axis, e.g., black strips. As shown in FIG. 1B, the positions of the first light-shielding elements 340 substantially correspond to the boundaries between the left-eye pixel regions 311 and the right-eye pixel regions 312, respectively. Center axes 340a of the first light-shielding elements 340 may substantially align with the center axis 330a of the black matrix layer 330 at the boundaries between the left-eye pixel regions 311 and the right-eye pixel regions 312, respectively, as shown in FIG. 1B.

Being disposed at the boundaries between the left-eye pixel regions 311 and the right-eye pixel regions 312, the first light-shielding elements 340 are capable of shielding "cross-region" light beams. In other words, the first light-shielding elements 340 are capable of shielding light beams, e.g., L2 and R2, which pass along unexpected directions or possibly cause visual crosstalk. Accordingly, by shielding the light beams such as L2 and R2 with the first light-shielding elements 340, visual crosstalk as a result of the right eye perceiving the left-eye image or the left eye perceiving the right-eye image is mitigated. Therefore, under various viewing angles, the left and right eyes are respectively able to receive a largest amount of predetermined and correct light beams. The light beams received by the left and right eyes are then superimposed in the brain to recreate a 3D image.

In this embodiment, a width B2 of the first light-shielding elements 340 is adjustable, and could be substantially equal to or greater than a width of the black matrix layer 330. As the width B2 gets larger, the first light-shielding elements 340 becomes capable of shielding more light beams that pass through unexpected phase retardation regions, e.g., the light beams L2 and R2. Accordingly, a viewing angle range is significantly increased under a certain degree of crosstalk. In contrast, as the width B2 gets smaller, an aperture rate of the display device 2 could be increased to enhance brightness presented by the display device 2. Alternatively, as the width B2 gets smaller, overall brightness performance of the display device 2 could be maintained while brightness of the backlight module is reduced.

In this embodiment, the polarization film 370 is disposed between the phase retardation film 370 and the first light-shielding elements 340 to allow light beams of a predetermined polarization direction to pass through. The display device 2 may further include another polarization film (not shown) disposed on the other side of the phase retardation film 360 relative to the polarization film 370. The display module 300 further includes a second transparent substrate 320, e.g., a glass substrate. The second transparent substrate 320 is disposed between the first light-shielding elements 340 and the polarization film 370. A thickness of the second transparent substrate 320 may be selected for adjusting a distance between the first light-shielding elements 340 and the polarization film 370. In another embodiment, the second transparent substrate 320 may be omitted. The display module 300 may includes a transparent plastic body 380 for adhering the phase retardation film 360 and the polarization film 370, or the first light-shielding elements 340, the first transparent substrate 310 and the second transparent substrate 310, for example.

Figure 2:
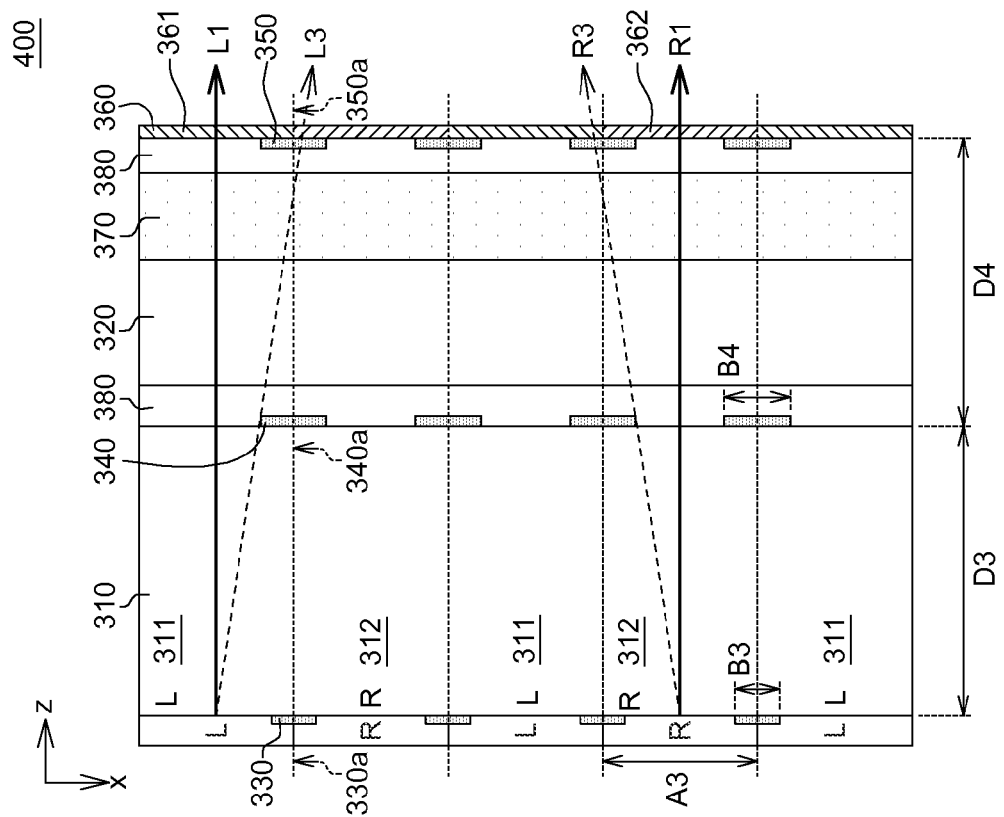
FIG. 2 is a side view of a display device according to another embodiment of the present disclosure.

FIG. 2 shows a side view of a display module according to another embodiment of the present disclosure. A main difference between a display module 400 according to this embodiment and the display module 300 according to the previous embodiment is that, the display module 400 further includes a number of second light-shielding elements 350 disposed on one side of the phase retardation film 360. The polarization film 370 is disposed between the first light-shielding elements 340 and the second light-shielding elements 350. In this embodiment, positions of the second light-shielding elements 350 substantially correspond to the boundaries between the first-phase retardation regions 311 and the second-phase retardation regions 312, respectively. Center axes 350a of the second light-shielding elements 350 are substantially aligned with the axes 340a of the first light-shielding elements 340, respectively. For example, a width of the second light-shielding elements 350 is substantially equal to, but not limited to, a width B4 of the first light-shielding elements 340.

Disposition of the second light-shielding elements 350 may also shields the "cross-region" light beams. Take the light beam L3 for example. The light beam L3, entering the first transparent substrate 310 from the left-eye pixel region 311 towards the −z-axis, is not shielded by the first light-shielding element 340 and thus directly passes through the second-phase retardation region 362. Yet, by use of the second light-shielding elements 350, the light beam L3 is shielded to prevent visual crosstalk caused by unexpected light beams. The light beam R3 may be shielded similarly.

Figure 4:
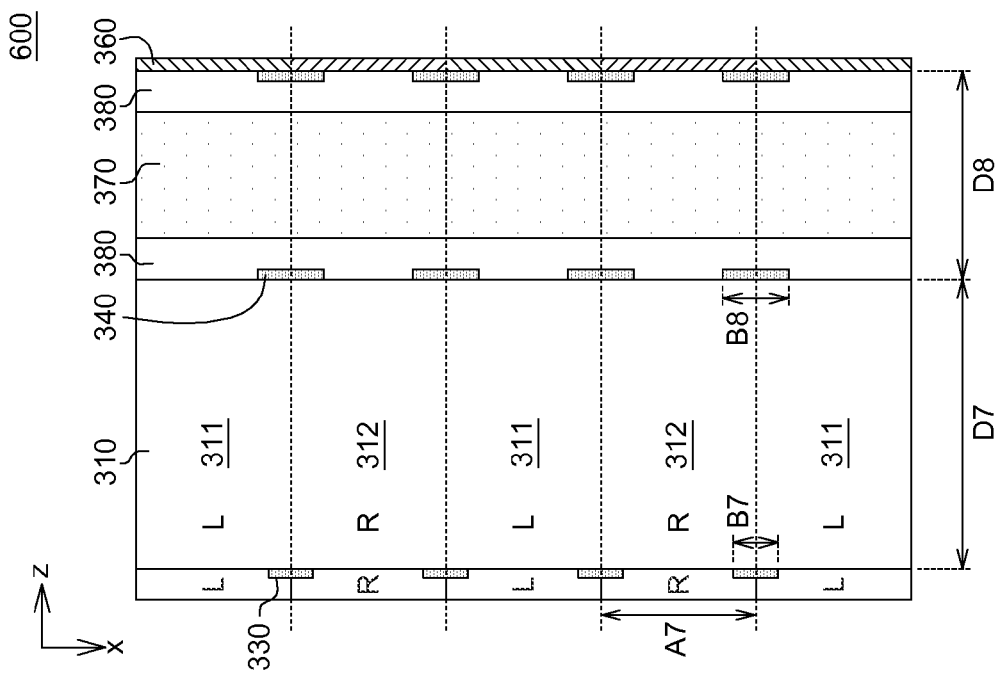
FIG. 4 is a side view of a display device according to another embodiment of the present disclosure.
Figure 3:
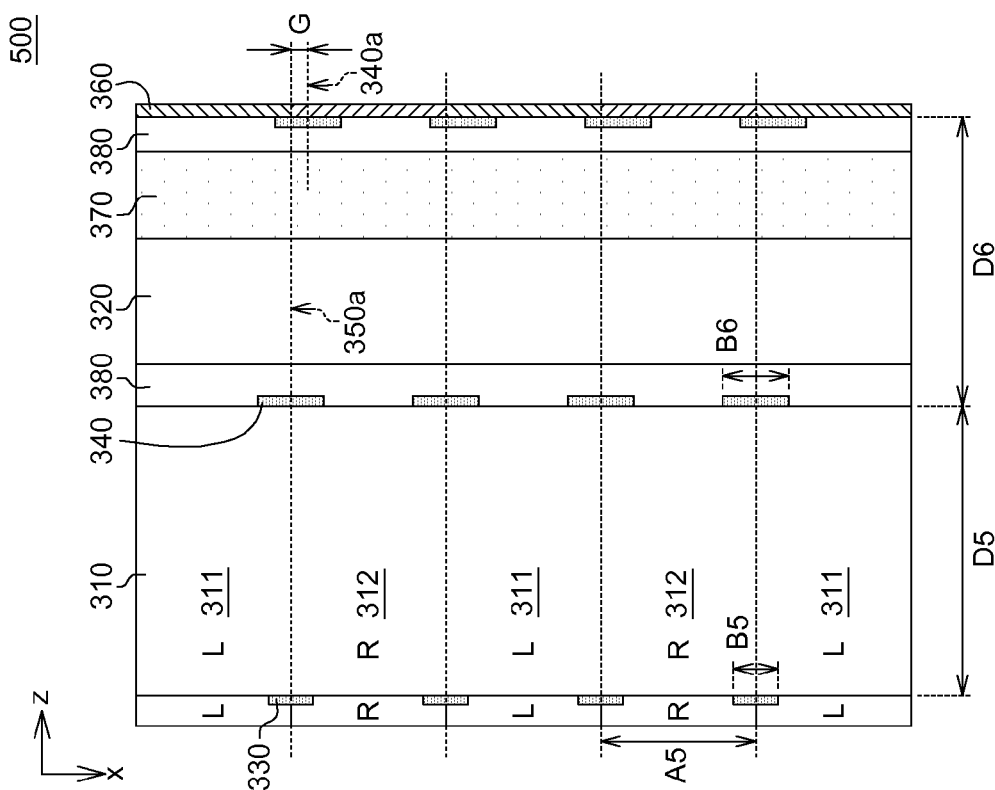
FIG. 3 is a side view of a display device according to another embodiment of the present disclosure.

In this embodiment, for example, a distance D3 between the black matrix layer 330 and the first light-shielding elements 340 and a distance D4 between the first light-shielding elements 340 and the second light-shielding elements 350 are substantially equal (as shown in FIG. 1A, FIG. 2 and FIG. 3), or different (as shown in FIG. 4). The second transparent substrate 320 may be disposed between the second light-shielding elements 350 and the first light-shielding elements 340. The thickness of the second transparent substrate 320 may be selected for adjusting the distance D4 between the second light-shielding elements 350 and the first light-shielding elements 340. Other operation details are similar to those of the display module 300, and shall not be again described for brevity.

FIG. 3 shows a side view of a display module according to yet another embodiment of the present disclosure. A main difference between a display module 500 and the display module 400 according to the previous embodiment is that, between the center axes 340a of the first light-shielding elements 340 and the center axes 350a of the second light-shielding elements 350 is a gap G. For example, the gap G is a tolerable error resulted from an adhesion process. Other operation details are similar to those of the display module 400, and shall not be again described for brevity.

FIG. 4 shows a side view of a display module according to another embodiment of the present disclosure. A main difference between a display module 600 and the display module 400 is that, the second transparent substrate 320 is omitted in the display module 600. A distance D7 between the black matrix layer 330 and the first light-shielding elements 340 is substantially greater than a distance D8 between the first light-shielding elements 340 and the second light-shielding elements 350. Other operation details of the display module 600 are similar to those of the display module 400, and shall not be again described for brevity.

First to sixth embodiments and first to second comparisons with different distances and widths are to be described below for comparing viewing angles and aperture ratios. Settings of the distances and widths in the first to sixth embodiments and the first to second comparisons shall be first given.

First Embodiment

Referring to FIG. 1, the distance D1 between the black matrix layer 330 and the first light-shielding elements 340 and the distance D2 between the first light-shielding elements 340 and the phase retardation film 360 are 700 μm. The width B1 of the black matrix layer 330 is 100 μm, and the width B2 of each of the first light-shielding elements 340 is 150 μm. The width A1 of each left-eye pixel region 311 and each right-eye pixel region 312 is 363 μm.

Second Embodiment

Referring to FIG. 2, the distance D3 between the black matrix layer 330 and the first light-shielding elements 340 and the distance D4 between the first light-shielding elements 340 and the second light-shielding elements 350 are 700 μm. The width B3 of the black matrix layer 330 is 100 μm, and the width B4 of each first light-shielding element 340 and each second light-shielding element 350 is 150 μm. The width A3 of each left-eye pixel region 311 and each right-eye pixel region 312 is 363 μm.

Third Embodiment

Referring to FIG. 2, the distance D3 between the black matrix layer 330 and the first light-shielding elements 340 and the distance D4 between the first light-shielding elements 340 and the second light-shielding elements 350 are 700 μm. The width B3 of the black matrix layer 330 is 75 μm, and the width B4 of each first light-shielding element 340 and each second light-shielding element 350 is 105 μm. The width A3 of each left-eye pixel region 311 and each right-eye pixel region 312 is 363 μm.

Fourth Embodiment

Referring to FIG. 3, the distance D5 between the black matrix layer 330 and the first light-shielding elements 340 and the distance D6 between the first light-shielding elements 340 and the second light-shielding elements 350 are 700 μm. The width B5 of the black matrix layer 330 is 100 μm, and the width B6 of each first light-shielding element 340 and each second light-shielding element 350 is 150 μm. The width A5 of each left-eye pixel region 311 and each right-eye pixel region 312 is 363 μm. The gap G is 30 μm.

Fifth Embodiment

Referring to FIG. 3, the distance D5 between the black matrix layer 330 and the first light-shielding elements 340 and the distance D6 between the first light-shielding elements 340 and the second light-shielding elements 350 are 700 μm. The width B5 of the black matrix layer 330 is 75 μm, and the width B6 of each first light-shielding element 340 and each second light-shielding element 350 is 105 μm. The width A5 of each left-eye pixel region 311 and each right-eye pixel region 312 is 363 μm. The gap G is 30 μm.

Sixth Embodiment

Referring to FIG. 4, the distance D7 between the black matrix layer 330 and the first light-shielding elements 340 is 700 μm, and the distance D8 between the first light-shielding elements 340 and the second light-shielding elements 350 is 300 μm. The width B7 of the black matrix layer 330 is 100 μm, and the width B8 of each first light-shielding element 340 and each second light-shielding element 350 is 150 μm. The width A7 of each left-eye pixel region 311 and each right-eye pixel region 312 is 363 μm.

First Comparison

A conventional display device may be as shown in FIG. 4, with the first light-shielding elements 340 omitted. A distance between the black matrix layer 330 and the second light-shielding elements 350 is 1000 μm. The width B7 of the black matrix layer 330 is 100 μm, and the width B8 of each second light-shielding element 340 is 150 μm. The width A7 of each left-eye pixel region 311 and each right-eye pixel region 312 is 363 μm.

Second Comparison

Except for a 30 μm gap between the center axes of the second light-shielding elements and the center axis of the black matrix layer, other details of the display device in the second comparison are the same as the first comparison.

Table 1 lists performance results of the above embodiments and comparisons, and a viewing angle having crosstalk smaller than or equal to 7% is taken as a comparison benchmark. Definitions of the viewing angle and crosstalk shall be given with reference to FIG. 1A. The viewing angle parallel to the z-axis towards the center of the display device 2 is defined as 0 degree. As a viewer moves towards the −x-axis, an included angle α between a line connecting the viewer and the display device 2 and the z-axis is formed.

A value of the crosstalk represents a percentage obtained from dividing a light intensity received by the left lens of the glasses from the display device 2 for the right eye (i.e., unintended light beams) by a light intensity received by the left lens from the display device 2 for the left eye (i.e., correct light beams). Under a predetermined included angle α, as the percentage of the crosstalk gets smaller, it means that crosstalk received by the viewer when viewing the display device 2 under the predetermined angle α is also decreased. Generally speaking, the crosstalk value is the smallest when the included angle α is 0 degree. Thus, the crosstalk value increases as an absolute value of the included angle α gets larger. Table 1 lists the viewing angle range and total viewing angle when the crosstalk value is smaller than or equal to 7%.

TABLE 1

|  | Viewing angle range (total viewing angle) when crosstalk is smaller than or equal to 7% |
| --- | --- |
| First embodiment | −13°~+15° (28°) |
| Second embodiment | −16°~+16° (32°) |
| Third embodiment | −12°~+12° (24°) |
| Fourth embodiment (with gap) | −13°~+15° (28°) |
| Fifth embodiment (with gap) | −09°~+12° (21°) |
| Sixth embodiment | −15°~+15° (30°) |
| First comparison | −12°~+12° (24°) |
| Second comparison (with gap) | −07°~+15° (22°) |

Results of Table 1 have indicated that, except for the third embodiment and the fifth embodiment, regardless whether a gap is present, the total viewing angles of the remaining embodiments have been significantly improved compared to that of the two comparisons. More specifically, for situations without the gap, the total viewing angle of the first comparison is only 24 degrees, whereas the total viewing angles of the first, second and sixth embodiments are at least 28 degrees to improve the total viewing angle by 4 degrees. For situations with the gap, the total viewing angle of the second comparison is merely 22 degrees, whereas the total viewing angle of the fourth embodiment reaches 28 to improve the total viewing angle by as much as 6 degrees.

In the third and fifth embodiments, the width of the black matrix layer 330 is 75 μm, and the widths of the first light-shielding elements 340 and the second light-shielding elements 350 are 105 μm. The two widths are respectively shorter than the width of 100 μm of the black matrix layer 330 and the widths of 150 μm of the first light-shielding elements 340 and the second light-shielding elements 350 in other embodiments. That is to say, although the light-shielding capability of the display device of the third and fifth embodiments is rather average as a result of the above shorter widths, the total viewing angle is more or less the same as that of the corresponding comparisons. However, due to the shorter widths of the black matrix layer 330, the first light-shielding elements 340 and the second light-shielding elements 350 in the third and fifth embodiments, the aperture ratio of the display device is considerably improved for enhancing the display brightness. Table 2 lists the aperture ratio tested for the third and fifth embodiments as well as the first and second comparisons, under conditions that the crosstalk is 7% and the total viewing angle is 24 degrees.

TABLE 2

|  | Aperture |
| --- | --- |
| Third embodiment | 57.6% |
| Fifth embodiment (with gap) | 54.2% |
| First comparison | 47.5% |
| Second comparison (with gap) | 46.4% |

Results of Table 2 have indicated that, regardless whether the gap is present, the apertures of the embodiments compared to that of the comparisons have been improved by at least 7.8%. Thus, enhanced brightness is offered when viewing the display device; alternatively, same brightness performance is achieved by using smaller backlight brightness to save resources. Further, on top of the outstanding performance of improving the aperture ratio by 7.8%, the third and fifth embodiments maintain the total viewing angle at a satisfactory level under the requirement of the crosstalk being below 7%.

By use of the first light-shielding elements, the display device effectively shields light beams of unexpected passing directions, e.g., right-eye light beams entering the left eye or left-eye light beams entering the right eye. Accordingly, both eyes are allowed to receive dedicated light beams to reduce visual crosstalk. The second light-shielding elements may be additionally provided to shield more light beams of unexpected passing directions. Further, given that predetermined widths are designed for the black matrix layer and the first and second light-shielding elements, the display module according to the corresponding embodiments offers an enlarged visual range under a desired crosstalk level compared to the prior art. Meanwhile, by reducing the widths of the black matrix layer and the first and second light-shielding elements in a way that the viewing angle range of the embodiments is similar to that of the prior art, the aperture ratio of the embodiments is noticeably increased compared to that of the prior art. Consequently, the display device of the present disclosure is capable of providing enhanced display brightness, or achieving the same brightness performance while lower brightness of the backlight module is adopted.

While the disclosure has been described by way of example and in terms of the preferred embodiments, it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A display module, comprising:
a first transparent substrate, comprising a plurality of left-eye pixel regions and a plurality of right-eye pixel regions for respectively displaying left-eye images and right-eye images, each of the left-eye pixel regions being adjacent to each of the right-eye pixel regions;
a black matrix layer, disposed on one side of the first transparent substrate, and corresponding to a first boundary of the adjacent left-eye pixel region and right-eye pixel region;
a plurality of first light-shielding elements, disposed on an other side of the first transparent substrate, and substantially corresponding to the first boundary, respectively; and
a phase retardation film, disposed on the other side of the first transparent substrate, comprising a plurality of first-phase retardation regions and a plurality of second-phase retardation regions, the first-phase retardation regions and the second-phase retardation regions having different phases, positions of the first-phase retardation regions and the second-phase retardation regions substantially corresponding to positions of the left-eye pixel regions and the right-eye pixel regions, respectively.

2. The display module according to claim 1, further comprising a first polarization film disposed between the phase retardation film and the first light-shielding elements.

3. The display module according to claim 1, further comprising a plurality of second light-shielding elements disposed on one side of the phase retardation film, and positions of the second light-shielding elements substantially corresponding to a second boundary between the first-phase retardation regions and the second-phase retardation regions.

4. The display module according to claim 3, wherein center axes of the second light-shielding elements are substantially aligned with center axes of the first light-shielding elements, respectively.

5. The display module according to claim 3, further comprising a second transparent substrate disposed between the second light-shielding elements and the first light-shielding elements.

6. The display module according to claim 3, wherein the second light-shielding elements are substantially strip-shaped.

7. The display module according to claim 1, wherein center axes of the first light-shielding elements are substantially aligned with a center axis of the black matrix layer at the first boundary.

8. The display module according to claim 1, wherein the left-eye pixel regions and the right-eye pixel regions are substantially strip-shaped.

9. The display module according to claim 1, wherein the first light-shielding elements are substantially strip-shaped.

10. The display module according to claim 2, further comprising a second polarization film disposed on an other side of the phase retardation film relative to the first polarization film.

11. The display module according to claim 3, wherein a width of the first light-shielding elements is substantially equal to a width of the second light-shielding elements.

12. The display module according to claim 11, wherein the width of the first light-shielding elements is substantially equal to a width of the black matrix layer.

13. The display module according to claim 11, wherein the width of the first light-shielding elements is substantially greater than a width of the black matrix layer.

14. The display module according to claim 3, wherein a distance between the black matrix layer and the first light-shielding elements is substantially equal to a distance between the first light-shielding elements and the second light-shielding elements.

15. The display module according to claim 3, wherein a distance between the black matrix layer and the first light-shielding elements is substantially greater than a distance between the first light-shielding elements and the second light-shielding elements.

16. A display device, comprising:
a thin-film transistor module;
a display module, comprising:
a first transparent substrate, comprising a plurality of left-eye pixel regions and a plurality of right-eye pixel regions for respectively displaying left-eye images and right-eye images, each of the left-eye pixel regions being adjacent to each of the right-eye pixel regions;
a black matrix layer, disposed on one side of the first transparent substrate, corresponding to a first boundary of the adjacent left-eye pixel region and right-eye pixel region;
a plurality of first light-shielding elements, disposed on an other side of the first transparent substrate, substantially corresponding to the first boundary of the adjacent left-eye pixel region and right-eye pixel region, respectively;
a phase retardation film, disposed on the other side of the first transparent substrate, comprising a plurality of first-phase retardation regions and a plurality of second-phase retardation regions, the first-phase retardation regions and the second-phase retardation regions having different phases, positions of the first-phase retardation regions and the second-phase retardation regions substantially corresponding to positions of the left-eye pixel regions and the right-eye pixel regions, respectively; and a first polarization film, disposed between the phase retardation film and the first light-shielding elements; and a liquid crystal layer, disposed between the thin-film transistor module and the display module.

* * * * *